(12) United States Patent
Miyamori et al.

(10) Patent No.: US 7,663,280 B2
(45) Date of Patent: Feb. 16, 2010

(54) SPINDLE MOTOR AND DISK DRIVE DEVICE USING THE SAME

(75) Inventors: Kenichi Miyamori, Hyogo (JP); Shigeo Obata, Hyogo (JP); Hiromitsu Noda, Fukui (JP); Hiromi Kita, Nara (JP)

(73) Assignee: Panasonic Corporation, Osaka (JP)

( * ) Notice: Subject to any disclaimer, the term of this patent is extended or adjusted under 35 U.S.C. 154(b) by 198 days.

(21) Appl. No.: 11/912,948

(22) PCT Filed: May 19, 2006

(86) PCT No.: PCT/JP2006/310022

§ 371 (c)(1),
(2), (4) Date: Oct. 29, 2007

(87) PCT Pub. No.: WO2006/123773

PCT Pub. Date: Nov. 23, 2006

(65) Prior Publication Data

US 2009/0072642 A1 Mar. 19, 2009

(30) Foreign Application Priority Data

| May 19, 2005 | (JP) | ............................. | 2005-146232 |
| May 19, 2005 | (JP) | ............................. | 2005-146233 |

(51) Int. Cl.
*H02K 7/08* (2006.01)
*H02K 7/00* (2006.01)

(52) U.S. Cl. .................... 310/90; 310/67 R; 360/98.07; 360/99.01; 360/99.04; 360/99.08

(58) Field of Classification Search ............... 310/67 R, 310/90; 360/98.04, 99.01, 99.04, 99.08
See application file for complete search history.

(56) References Cited

U.S. PATENT DOCUMENTS 5,914,832 A * 6/1999 Teshima .................. 360/98.07

(Continued)

FOREIGN PATENT DOCUMENTS

JP 6-180435 6/1994

(Continued)

OTHER PUBLICATIONS

International Search Report issued Jul. 25, 2006 in the International (PCT) Application of which the present application is the U.S. National Stage.

*Primary Examiner*—Quyen Leung
*Assistant Examiner*—Leda Pham
(74) *Attorney, Agent, or Firm*—Wenderoth, Lind & Ponack, L.L.P.

(57) ABSTRACT

A spindle motor and a disk drive device are provided that have a high operation efficiency of the motor, that does not leak oil, and that has an improved stability by decreasing a runout component in the direction of the rotation axis. The spindle motor includes a rotor hub (20) composed of a disk-like flange (201) and a cylinder-shaped shaft (203); a ring-shaped rotating magnet (16) fastened on one main surface of the flange (201); an armature (14) facing the rotating magnet (16); a sleeve (80) rotatably supporting the shaft (203); and a chassis (15) fixing the armature (14) and the sleeve (80). The flange (201) and the shaft (203) are integrally formed with magnetic material; a protrusion is not provided between a mounting surface (204) for mounting the rotating magnet (16) thereon and a counter-face surface (205) facing the end surface of the sleeve; and the mounting surface (204) and the counter-face surface (205) are orthogonal to the direction of the central axis (A-A') of the shaft (203), and in a level plane; or the mounting surface (204) is recessed stepwise from the counter-face surface (205) toward the disk mounting portion (202).

11 Claims, 7 Drawing Sheets

U.S. PATENT DOCUMENTS

| | | | |
|---|---|---|---|
| 6,316,857 B1 * | 11/2001 | Jeong | 310/90 |
| 6,364,532 B1 * | 4/2002 | Yoshikawa et al. | 384/107 |
| 6,712,513 B2 * | 3/2004 | Tanaka et al. | 384/100 |
| 6,717,310 B2 * | 4/2004 | Yoshikawa et al. | 310/90 |
| 6,828,709 B2 * | 12/2004 | Grantz et al. | 310/90 |
| 2004/0091188 A1 * | 5/2004 | Aiello et al. | 384/119 |
| 2004/0208404 A1 * | 10/2004 | Dittmer et al. | 384/107 |
| 2004/0223673 A1 * | 11/2004 | Tiller et al. | 384/107 |
| 2005/0286820 A1 * | 12/2005 | Grantz et al. | 384/119 |

FOREIGN PATENT DOCUMENTS

| | | |
|---|---|---|
| JP | 10-080091 | 3/1998 |
| JP | 11-025062 | 1/1999 |
| JP | 2002-058186 | 2/2002 |
| JP | 2003-088042 | 3/2003 |
| JP | 2003-264954 | 9/2003 |
| JP | 2004-248344 | 9/2004 |
| JP | 2004-316680 | 11/2004 |

* cited by examiner

SPINDLE MOTOR AND DISK DRIVE DEVICE USING THE SAME

TECHNICAL FIELD

The present invention relates to a spindle motor equipped with a dynamic pressure bearing and to a disk drive device using the spindle motor.

BACKGROUND ART

For the bearing of a spindle motor used for such as a disk drive device that records and reproduces information by rotating a disk-shaped recording medium such as a hard disk, various kinds of dynamic pressure bearings are proposed that utilize fluid pressure of lubricating fluid such as oil intervening between a shaft and a sleeve to rotatably support the shaft and sleeve for rotation relative to one another.

A spindle motor including such a dynamic pressure bearing is required to prevent a negative pressure from occurring in the oil with a simplified structure while maintaining desired bearing rigidity as well as reducing thickness of the bearing and reducing its cost.

FIG. 13 is a sectional view of a spindle motor proposed to solve the above-described problem (e.g. Japanese Patent Unexamined Publication No. 2003-88042, referred to as literature 1 hereinafter). In this spindle motor, rotor hub 901, shaft 902, and rotating magnet 903 compose rotor 900. Rotor hub 901 includes substantially disk-shaped flange (top plate) 904 and cylinder-shaped back yoke 905 hanging down from the outer circumferential edge of flange 904. One end of shaft 902 is externally fitted to the central part of flange 904 of rotor hub 901. Further, radial dynamic pressure bearings 906, 907, which generate fluid dynamic pressure in the oil while rotor 900 is rotating, are provided on the inner circumferential surface of sleeve 908 and the outer circumferential surface of shaft 902.

At least one of the top end surface of sleeve 908 or flange 904 of rotor hub 901 is provided with dynamic pressure generating grooves (not shown) to compose thrust bearing 909. Here, the dynamic pressure generating grooves are provided so as to apply the oil with a radially inward pressure while rotor 900 is rotating.

A series of minute gaps is formed between the top end surface of sleeve 908 and the bottom surface of flange 904 of rotor hub 901; between the outer circumferential surface of shaft 902 beyond flange 904 and the inner circumferential surface of sleeve 908; and between the end surface of shaft 902 and the inner surface of seal cap 910. The minute gap retain oil therein continuously, forming a dynamic pressure bearing with what is called a fulfilling structure. The end of shaft 902 forms a bearing that utilizes a pressure substantially balancing with the oil pressure within thrust bearing 909. This prevents a negative pressure from occurring in the oil with a simplified structure while maintaining desired bearing rigidity providing for reduced thickness and cost.

FIG. 14 illustrates an example of another conventional spindle motor (e.g. Japanese Patent Unexamined Publication No. 2004-248344, referred to as literature 2 hereinafter). As shown in FIG. 14, this spindle motor has shaft 923 integrally formed with rotor hub 921. Magnetic body 935 which generates magnetic attractive force between magnetic body 935 and field magnet 922 is provided on a part of base plate 931 where it faces field magnet 922, such that thrust force is developed.

In the above-described literature 1, a slight gap may be formed between the flange of the rotor hub and the fixing portion of the shaft, possibly causing oil filled as a dynamic pressure bearing to be drawn into the gap by capillarity. At this moment, the oil can undesirably leak from the boundary surface between the rotor hub on the central part of the top surface of the rotor and the shaft.

When fitting the rotor hub with the shaft, it is not easy to ensure the runout accuracy of the disk-mounting surface in the axial direction of the shaft. Accordingly, when a disk (not shown) is fitted, the axial component of the runout of the disk surface and its variation undesirably increase.

In the above-described literature 2, processing the shaft is difficult due to the cylinder-shaped back yoke, thereby undesirably deteriorating the processing accuracy. Further, the diameter of the shaft is difficult to measure, thereby preventing easy management of the steps of manufacturing spindle motors.

On the base plate, a magnetic body must be fixed to cause a magnetic attractive force between the magnetic body and a field magnet, at a position facing the field magnet, where in order to slim down the spindle motor, the thickness of the magnetic body needs to be reduced as well. However, with a thin magnetic body, it is difficult to ensure adequate strength, thereby causing a distortion in the circumferential direction of the spindle motor. Consequently, the amount of air gap between the field magnet and the magnetic body cannot be stabilized, and thus the axial runout component undesirably occurs upon the rotation of the rotor hub.

Moreover, the magnetic body fixed on the base plate loses its adhesivity due to factors such as aging and temperature change, eventually causing possible desorption of the magnetic body. If desorption occurs, generation of force in the thrust direction ceases, thereby deteriorating the bearing performance.

SUMMARY OF THE INVENTION

The present invention provides a spindle motor while solving the above-described problems, with high operation efficiency, free from oil leakage, with a suppressed runout component in the direction of the rotation axis of the disk, and with improved stability; and a disk drive device using the spindle motor.

A spindle motor of the present invention includes (a) a rotor hub composed of a disk-shaped flange having a disk mounting portion for placing a disk thereon, on one main surface of the hub; and a cylinder-shaped shaft formed on one main surface of the hub, opposite to the disk mounting portion of the flange; (b) a ring-shaped rotating magnet fastened concentrically with the shaft, on one main surface of the flange, opposite to the disk mounting portion; (c) an armature facing the rotating magnet, and generating a rotating force with a central axis of the shaft as a center, for the rotating magnet; (d) a sleeve facing one main surface of the flange, opposite to the disk mounting portion, and rotatably supporting the shaft; and (e) a chassis fixing the armature and the sleeve.

In addition, (f) the flange and the shaft of the rotor hub are integrally formed with magnetic material; (g) a protrusion is not provided between a mounting surface for mounting the rotating magnet thereon and a counter-face surface facing an end surface of the sleeve, on one main surface of the flange, opposite to the disk mounting portion; (h) and additionally the mounting surface and the counter-face surface are on a level plane orthogonal to a direction of a central axis of the shaft, or the mounting surface is recessed stepwise from the counter-face surface toward the disk mounting portion.

This makeup enables the rotor hub to have a simple shape and structure, thereby allowing the rotor hub to be processed at low cost and additionally with a high degree of accuracy. Here, the flange and the shaft of the rotor hub are preferably formed integrally and homogeneously.

Further, the shaft is formed integrally with the rotor hub, thereby facilitating accurate processing of each surface of the rotor hub composing the radial dynamic pressure bearing and the thrust bearing. In addition, leakage of oil for generating a dynamic pressure can be prevented, thereby implementing a spindle motor that is inexpensive, highly efficient, stable, and reliable.

In the above-described makeup, a cylinder-shaped back yoke made of magnetic material may be mounted on the inner circumference of the ring-shaped rotating magnet. With this makeup, a commonly used magnetic-field oriented magnet can be used. Further, processing can be performed integrally and accurately for the disk mounting portion of the rotor hub, the mounting surface and the plane of the rotating magnet in the same plane, and the shaft, thereby providing a superior spindle motor with its axial runout suppressed.

In the above-described makeup, the rotating magnet may be a magnet with its magnetization easy axis radially oriented and additionally with its outer circumferential surface polaranisotropically oriented as a working face.

This makeup improves the operation efficiency of a spindle motor while slimming down the spindle motor. In addition, the makeup dispenses with disposing a back yoke made of magnetic material, at the inner circumference of the rotating magnet, thereby enabling the rotor hub to have a simple shape and structure. Consequently, the shaft is easily processed and the dimensional accuracy of the axiswise diameter change is easily monitored. Consequently, the amount of gap between the outer circumferential surface of the shaft and the inner circumferential surface of the sleeve can be easily managed, which facilitates managing and stably maintaining the performance of the radial dynamic pressure bearing.

The above-described makeup requires as the minimum that the chassis is made of magnetic material, and a thrust adjusting plate made of magnetic material is disposed for adjusting a thrust force generated between the rotating magnet and the chassis, on the surface facing the chassis of the rotating magnet.

This makeup allows the shaft to be formed integrally with the rotor hub, thereby processing the rotor hub at low cost. In addition, the thrust adjusting plate allows a thrust force to be adjusted to an optimum value. Further, the shaft and the rotor hub are integrally formed, thus eliminating a gap between the shaft and the flange. Accordingly, oil filled inside the bearing to generate a dynamic pressure can be prevented from leaking.

Furthermore, the shaft and the rotor hub are composed integrally, and thus the runout in the direction of the central axis of the shaft of the rotor hub, caused by the rotation of the shaft can be suppressed to a small amount. This reduces the change in the amount of air gap between the rotating magnet placed on the rotor hub and the chassis facing the rotating magnet away therefrom, thereby reducing the fluctuation in the circumferential attractive force generated between the rotating magnet and the chassis. With this structure, vibration is unlikely to occur, and additionally the runout can be suppressed in the direction of the central axis of the shaft of the disk mounting portion for mounting a disk-shaped recording medium thereon, of the rotor hub. Furthermore, an inexpensive and highly reliable spindle motor can be provided.

In the above-described makeup, the thrust adjusting plate may be ring-shaped with its outer circumferential radius equal to or larger than that of the rotating magnet and additionally with its inner circumferential radius larger than that of the rotating magnet.

This makeup suppresses the fluctuation in thrust force due to the fluctuation in the distance between the rotating magnet and the chassis made of magnetic material, thereby suppressing the axiswise runout of the rotor hub. In addition, the axiswise runout component of the surface composing the thrust bearing at the rotor hub and a surface of such as the disk mounting portion can be suppressed to a small amount. Consequently, an inexpensive, highly accurate, reliable spindle motor can be provided.

In the above-described makeup, the thrust adjusting plate may be ring-shaped with its inner circumferential radius equal to or smaller than that of the rotating magnet, and with its outer circumferential radius smaller than that of the rotating magnet. In this case, the inner circumference of the thrust adjusting plate may face the axial direction of the shaft, with a predetermined distance from the stepped surface provided orthogonally to the central axis of the shaft, at the outer circumference of the sleeve.

With this makeup, the fluctuation of thrust force due to chipping and fracture in the inner circumference, that is likely to occur when producing a rotating magnet can be suppressed. Consequently, the axial runout component of the surface composing the thrust bearing of the rotor hub and a surface of such as the disk mounting portion can be suppressed. Further, the thrust adjusting plate can double as a retainer for preventing the rotor from extracting from the sleeve axiswise, thereby reducing the number of components. Consequently, an inexpensive, highly accurate, reliable spindle motor can be obtained.

In the above-described makeup, the sleeve is fixed to the chassis through a bearing retainer. Materials of the sleeve, bearing retainer, and chassis are selected so that their linear expansion coefficients will be ascending in that order. Alternatively, the following selection can be made. That is, the sleeve and bearing retainer are made of the same material; the linear expansion coefficient of the chassis is higher than that of the sleeve and bearing retainer; the linear expansion coefficients are descending in the order of the sleeve, bearing retainer, and chassis; or the sleeve and bearing retainer are made of the same material and the linear expansion coefficient of the chassis is lower that that of the sleeve and bearing retainer. With such makeup, the sleeve is bonded to a bearing retainer, and then the bearing retainer is bonded to the chassis when assembling a spindle motor, thereby suppressing distortion of the sleeve occurring after hardening of the adhesive. Consequently, the bearing performance of the radial dynamic pressure bearing and thrust bearing can be stabilized. In addition, the reliability of the bonding strength between the chassis and bearing retainer can be maintained over a long period. Further, suppression can be made of the deterioration of the bonding strength due to the fluctuation in such as storage temperature and the change of the shape of the bearing material due to the fluctuation in working temperature.

In the above-described makeup, grooves for generating a dynamic pressure are formed in at least one of the end surface of the rotor hub shaft and the thrust plate fastened to the sleeve so as to face this end surface, both blocking the bottom of the sleeve. Alternatively, a thrust bearing may be formed with the end surface of the rotor hub shaft and the thrust plate.

Otherwise, dynamic pressure generating grooves may be formed in at least one of the top end surface of the sleeve and one main surface of the flange facing the top end surface, opposite to the disk mounting portion, to form a thrust bearing by means of these surfaces.

With this makeup, the shaft is formed integrally with the rotor hub, thereby suppressing the runout in the direction of the axis of the surface forming a thrust bearing at the rotor hub. Further, this facilitates highly accurate processing, thereby stabilizing the performance of the dynamic pressure bearing.

In a disk drive device of the present invention, the device on which a disk-shaped recording medium for recording information is attached has a housing; a spindle motor fixed inside the housing, for rotating the disk-shaped recording medium; and an information access means for writing and reading to and from a predetermined position of the disk-shaped recording medium, where this spindle motor is either one of those described above.

With this makeup, the runout of a disk-shaped recording medium can be suppressed, thereby providing stable recording and reproducing to implement a slim, highly stable and reliable disk drive device.

As described hereinbefore, a spindle motor and a disk drive device of the present invention allow the rotor hub to have a simple shape and structure, resulting in the ability to produce the rotor hub at low cost. Meanwhile, the present invention facilitates managing the amount of gap between the outer circumferential surface of the shaft and the inner circumferential surface of the sleeve, thus stabilizing the performance of the radial dynamic pressure bearing. Moreover, if the rotating magnet is made of a magnet with its magnetization easy axis radially oriented and additionally with its outer circumferential surface polar-anisotropically oriented as a working face, the operation efficiency of the motor can be improved as well. Besides these advantages, the spindle motor can be slimmed down.

DETAILED DESCRIPTION OF PREFERRED EMBODIMENTS

Figure 1:
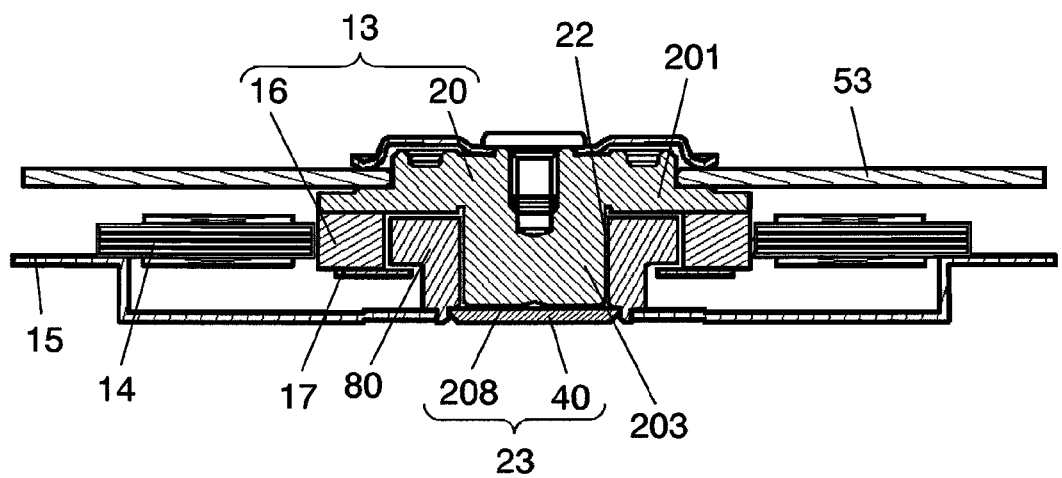
FIG. 1 is a sectional view illustrating the makeup of a spindle motor according to the first exemplary embodiment of the present invention.

Hereinafter, embodiments of the present invention and described with reference to the drawings. In the different figures, the same components are denoted by the same reference characters.

First Exemplary Embodiment

Figure 2:
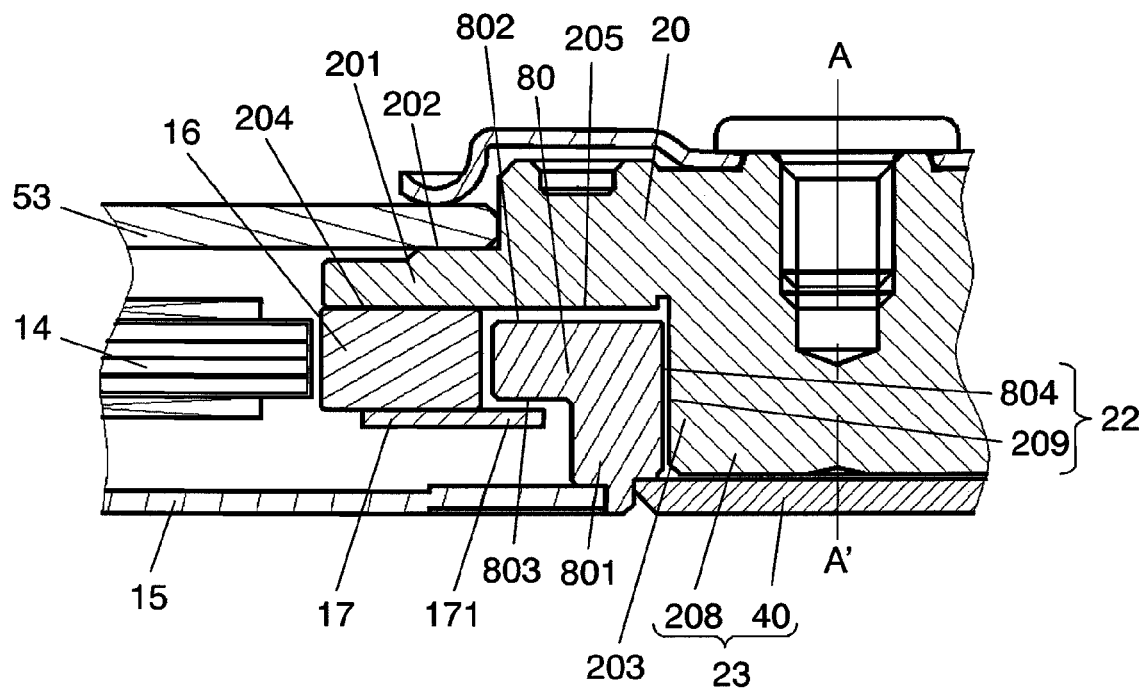
FIG. 2 is an enlarged sectional view illustrating the proximity of the dynamic pressure bearing in the spindle motor according to the first embodiment of the present invention.
Figure 3:
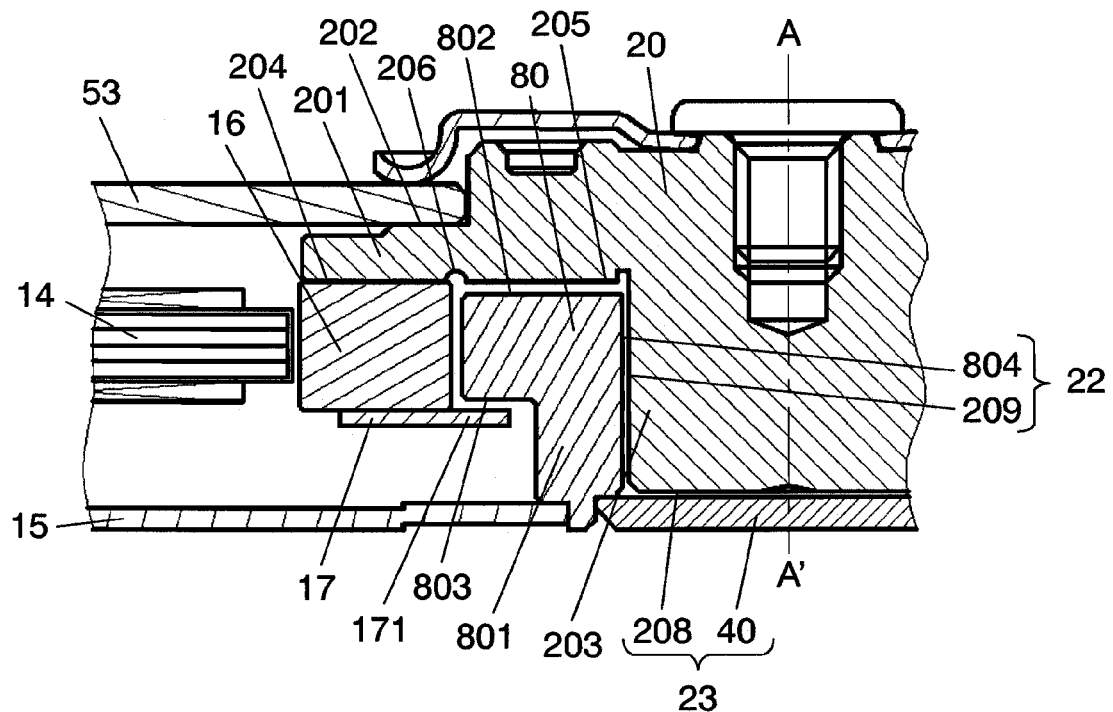
FIG. 3 is an enlarged sectional view illustrating another example of the proximity of the dynamic pressure bearing in the spindle motor according to the first embodiment of the present invention.
Figure 4:
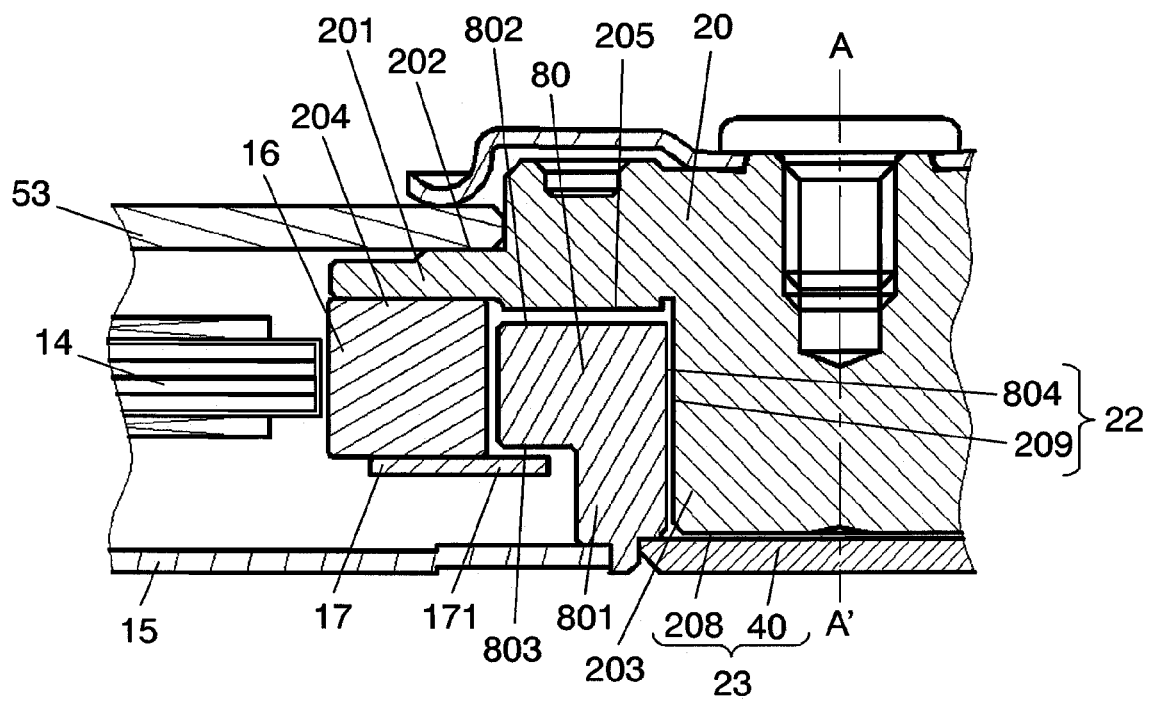
FIG. 4 is an enlarged sectional view illustrating still another example of the proximity of the dynamic pressure bearing in the spindle motor according to the first embodiment of the present invention.
Figure 5:
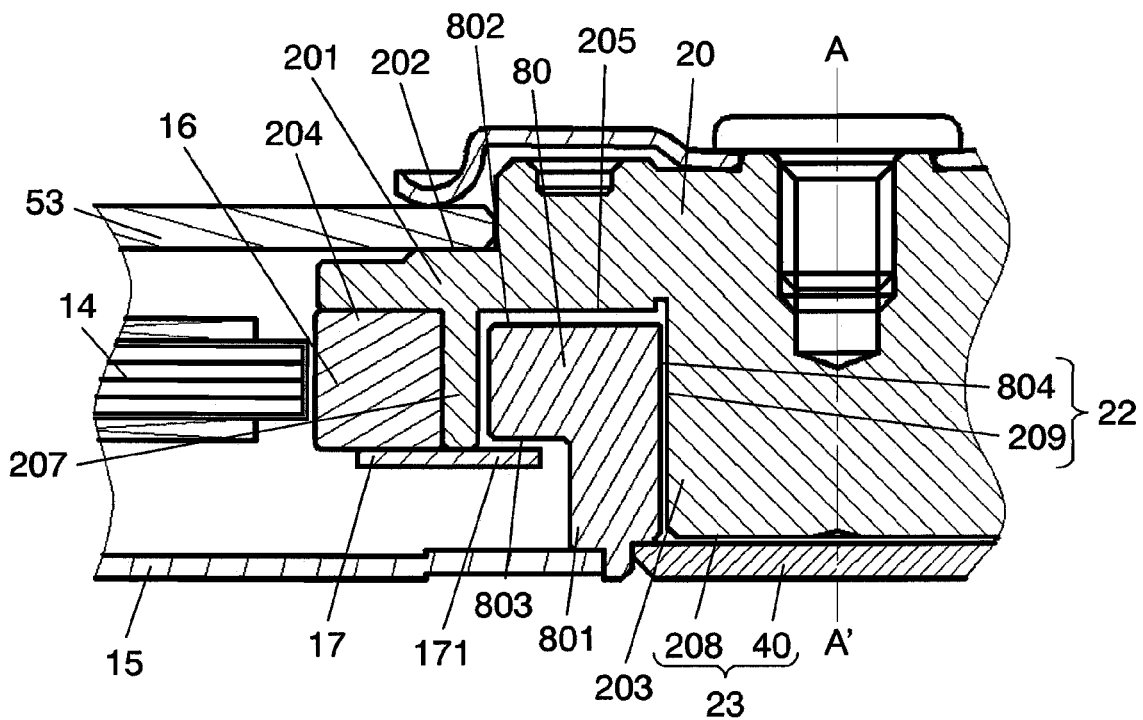
FIG. 5 is an enlarged sectional view illustrating an example of the spindle motor according to the first embodiment of the present invention, where the structure is partially changed.
Figure 6:
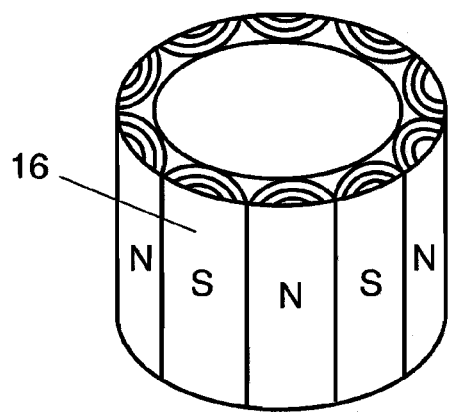
FIG. 6 is a perspective view illustrating the orientation of the rotating magnet in the spindle motor according to the first embodiment of the present invention.
Figure 7:
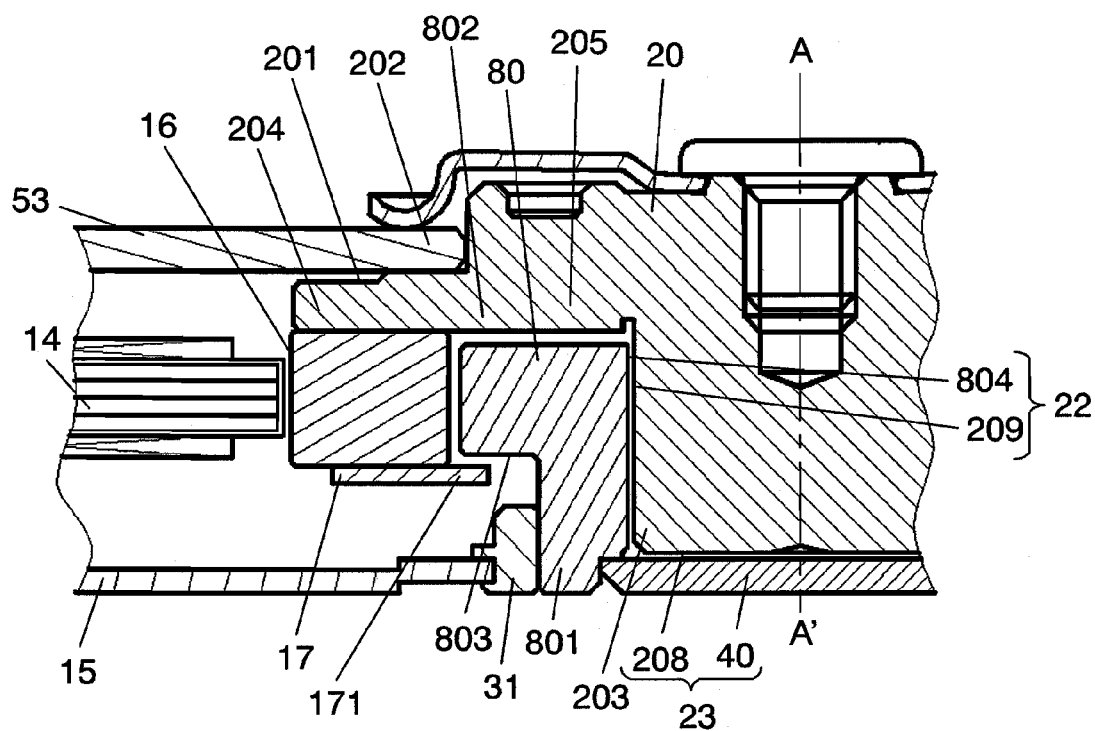
FIG. 7 is an enlarged sectional view illustrating yet another example of the proximity of the dynamic pressure bearing in the spindle motor according to the first embodiment of the present invention.
Figure 8:
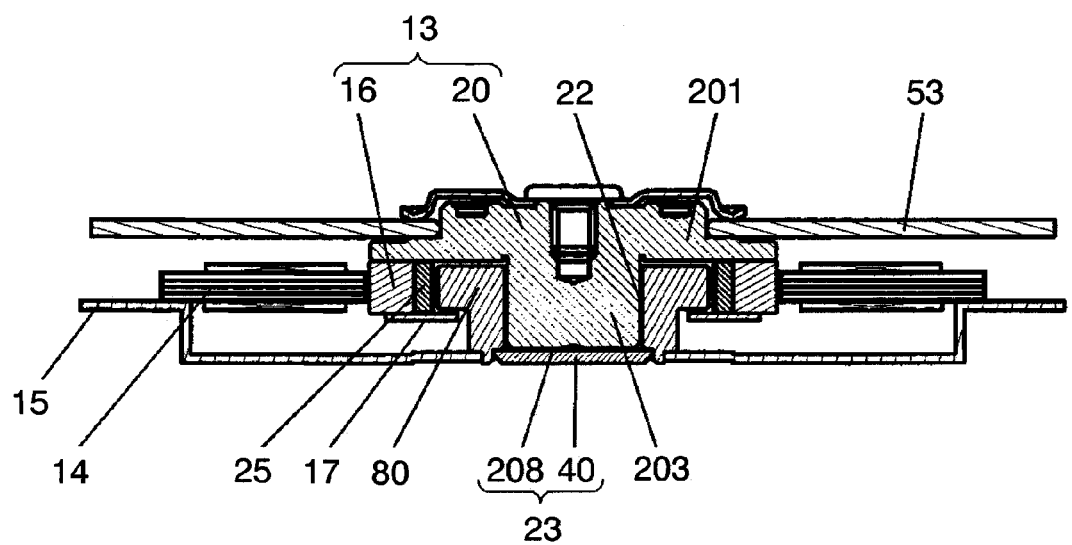
FIG. 8 is a sectional view illustrating another example of makeup of the spindle motor according to the first embodiment of the present invention.
Figure 9:
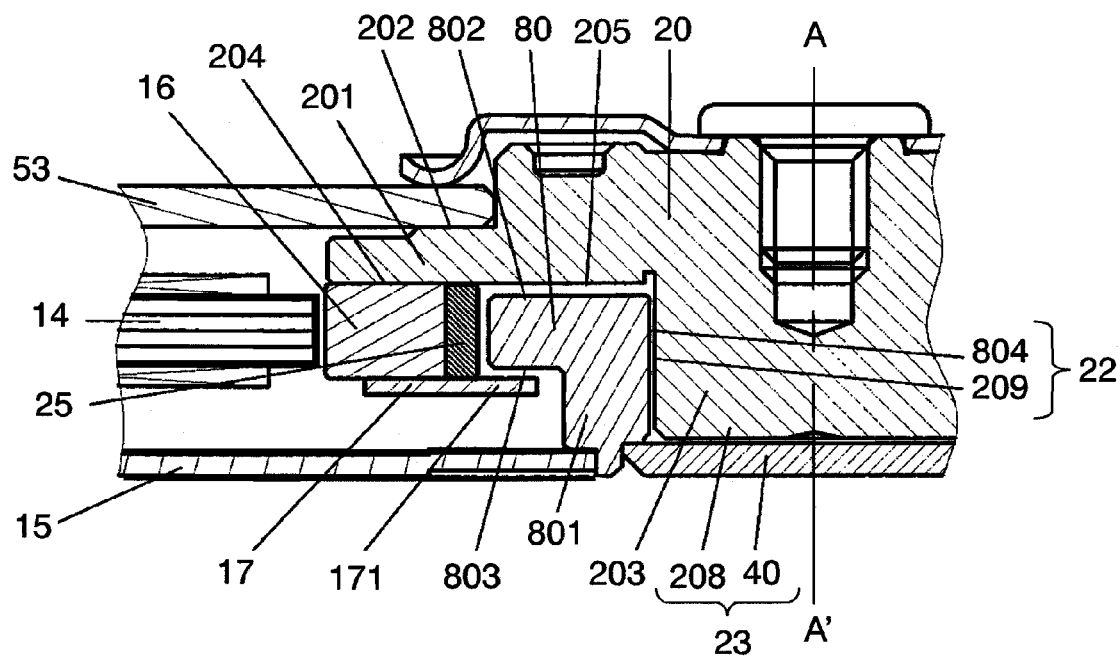
FIG. 9 is an enlarged sectional view illustrating the proximity of the dynamic pressure bearing of the spindle motor in the spindle motor according to the first embodiment of the present invention.
Figure 10:
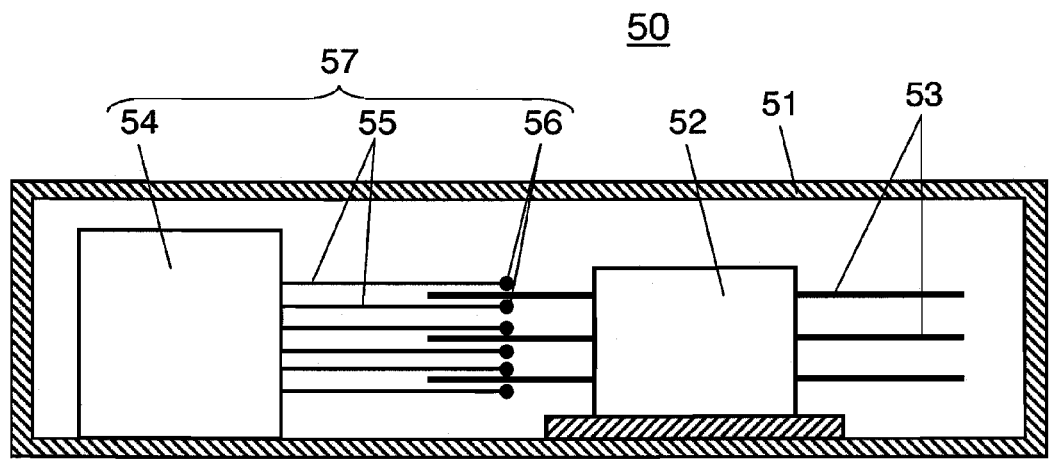
FIG. 10 is a schematic diagram illustrating the makeup of the disk drive device in the spindle motor according to the first embodiment of the present invention.

FIGS. 1 through 10 illustrate a spindle motor according to the first exemplary embodiment of the present invention and a disk drive device using the spindle motor. FIG. 1 is a sectional view illustrating the makeup of a spindle motor according to the first embodiment of the present invention. FIG. 2 is an enlarged sectional view illustrating the proximity of the dynamic pressure bearing of the spindle motor shown in FIG. 1. FIG. 3 is an enlarged sectional view illustrating another example of the proximity of the dynamic pressure bearing of the spindle motor. FIG. 4 is an enlarged sectional view illustrating still another example of the proximity of the dynamic pressure bearing of the spindle motor. FIG. 5 is an enlarged sectional view illustrating a comparative example corresponding to the spindle motor according to the first embodiment. FIG. 6 is a perspective view illustrating the orientation of the rotating magnet. FIG. 7 is an enlarged sectional view illustrating yet another example of the proximity of the dynamic pressure bearing of the spindle motor. FIG. 8 is a sectional view illustrating another example of the makeup of the spindle motor. FIG. 9 is an enlarged sectional view illustrating the proximity of the dynamic pressure bearing of the spindle motor shown in FIG. 8. FIG. 10 is a schematic diagram illustrating the makeup of a disk drive device. FIGS. 1 through 9, illustrating the makeup of the spindle motor, show the state in which disk plate 53 for recording information is attached.

As shown in FIGS. 1 and 2, a spindle motor according to the first embodiment is equipped with rotor hub 20, rotating magnet 16, armature 14, sleeve 80, and chassis 15. Rotor hub 20 includes disk-like flange 201, having disk mounting portion 202 for placing a disk thereon, on one main surface of hub 20; and shaft 203, having a cylinder-shaped outer circumference, formed in the central part of one main surface of hub 20, opposite to disk mounting portion 202 of flange 201. Rotating magnet 16 is ring-shaped and is fastened on the main surface of flange 201, opposite to disk mounting portion 202, concentrically with the central axis of shaft 203. Armature 14, facing rotating magnet 16, generates a rotating force for rotating magnet 16, with the central axis of shaft 203 as the center. Sleeve 80, facing one main surface of flange 201, opposite to disk mounting portion 202, rotatably supports shaft 203. Armature 14 and sleeve 80 are fixed to chassis 15.

Flange 201 and shaft 203 of rotor hub 20 are integrally formed with magnetic material. A protrusion is not provided between mounting surface 204 for mounting rotating magnet 16 thereon and counter-face surface 205 facing sleeve 80, on one main surface of flange 201, opposite to disk mounting portion 202, and additionally mounting surface 204 and counter-face surface 205 are orthogonal to the direction of the central axis of shaft 203 and provided in a level plane. Such a shape allows rotor hub 20 to be processed at low cost and additionally with a high degree of accuracy. Absence of a protrusion between mounting surface 204 and counter-face surface 205 implies that the portion connecting these surfaces with each other does not project toward end surface 802 of sleeve 80. More specifically, the portion connecting mounting surface 204 with counter-face surface 205 is not formed toward sleeve 80, but at roughly the same height as these two surfaces, or away from sleeve 80, namely toward disk mounting portion 202 of flange 201.

In this case, mounting surface 204 for mounting rotating magnet 16 thereon and counter-face surface 205 facing end surface 802 of sleeve 80 need to be orthogonal to central axis A-A' of shaft 203 and in a level plane, as the minimum requirement.

As shown in FIG. 3, for example, a recess 206 may be provided between mounting surface 204 and counter-face surface 205. That is, mounting surface 204 and counter-face surface 205 do not need to be one continuous plane. Even in this case, a protrusion is not provided at the portion connecting mounting surface 204 with counter-face surface 205, but recess 206 is formed away from end surface 802 of sleeve 80, namely toward disk mounting portion 202. Here, mounting surface 204 and counter-face surface 205 are orthogonal to the central axis of shaft 203 and additionally are formed as a level plane.

Alternatively, as shown in FIG. 4, mounting surface 204 may be recessed from counter-face surface 205 stepwise toward disk mounting portion 202. In FIG. 4, mounting surface 204 and counter-face surface 205 are orthogonal to central axis A-A' of shaft 203 and respectively formed on two different planes. If mounting surface 204 is thus closer to disk mounting portion 202 of flange 201 than counter-face surface 205, namely if recessed from counter-face surface 205, the workability of rotor hub 20 is hardly influenced, allowing easy processing. Rotor hub 20 is thus processed inexpensively and accurately.

However, as shown in FIG. 5 for example, even if mounting surface 204 and counter-face surface 205 are orthogonal to central axis A-A' of shaft 203 and formed as a level plane, providing a protrusion between mounting surface 204 and counter-face surface 205 toward sleeve 80 reduces the workability of rotor hub 20. That is, as shown in FIG. 5, forming a protrusion (back yoke 207 in this example) in the direction of central axis A-A' of shaft 203 makes it difficult to process rotor hub 20 accurately. As FIG. 5 indicates, the workability of a recess enclosed with back yoke 207 (protrusion) and shaft 203 is significantly reduced. Particularly, the workability of counter-face surface 205 is reduced. Further, it is difficult to process the outer diameter of shaft 203 at the recess and its outer circumferential surface with high surface accuracy, thus lowering the performance normally required of a bearing.

The description is made again for the spindle motor according to the first embodiment mainly with reference to FIGS. 1 and 2.

Hollow cylinder-shaped sleeve 80 rotatably supports shaft 203 of rotor hub 20. Thrust plate 40 is provided on a surface to block the bottom of sleeve 80 and additionally to face end surface 208 of shaft 203, where end surface 208 of shaft 203 and thrust plate 40 compose thrust bearing 23. Thrust plate 40 has dynamic pressure generating grooves (pump-in spiral grooves, not shown) for inducing a radially inward pressure in the oil (toward central axis A-A' of shaft 203) while rotor hub 20 is rotating. Thrust plate 40 is fastened to the bottom of sleeve 80.

Here, the gap distance between counter-face surface 205 of shaft 203 of rotor hub 20 and end surface 802 of sleeve 80 is longer than that between end surface 208 of shaft 203 and the surface of thrust plate 40 in which spiral grooves are formed.

Further, mounting surface 204 of flange 201 has rotating magnet 16 as shown in FIG. 6 fastened by such as bonding. This rotating magnet 16 is ring-shaped with its magnetization easy axis radially oriented and additionally with its outer circumferential surface polar-anisotropically oriented as a working face. On the top end surface of rotating magnet 16 in FIG. 6, the magnetic flux distribution on the surface is shown of the rotating magnet with its outer circumferential surface oriented polar-anisotropically as a working face. That is, this rotating magnet 16 is magnetized so that magnetic flux will not basically leak onto the inner circumferential surface of the ring and will distribute with the north pole and south pole alternately appearing. This rotating magnet 16 and rotor hub 20 compose rotor 13.

Armature 14 and sleeve 80 are fixed to chassis 15 made of magnetic material. Armature 14 faces rotating magnet 16 from a radially outward position via a predetermined air gap and generates a rotating force between armature 14 and rotating magnet 16 with central axis A-A' of shaft 203 as the center.

Then, a series of minute gaps is formed between outer circumferential surface 209 of shaft 203 and inner circumferential surface 804 of sleeve 80; and between end surface 208 of shaft 203 and the surface of thrust plate 40 in which the spiral grooves are formed. These minute gaps retain oil therein continuously, forming a dynamic pressure bearing with a what is called fulfilling structure.

Arrangement is made so that a magnetic attractive force developed between the surface facing chassis 15 of rotating magnet 16 and chassis 15 will generate a thrust force. Further, thrust adjusting plate 17, which is ring-shaped, is provided for adjusting a magnetic attractive force, is fixed by such as bonding on the surface facing chassis 15 of rotating magnet 16. Thrust adjusting plate 17 has an outer circumferential radius smaller than the external diameter of rotating magnet 16 and an inner circumferential radius smaller than the internal diameter of rotating magnet 16. Further, plate 17 is smaller than the external diameter at the large-diameter side of sleeve 80. Sleeve 80 has stepped surface 803 provided orthogonally to central axis A-A' of shaft 203, formed at the outer circumference of chassis 15, and small-diameter part 801 formed at the bottom. Sleeve 80 thus has a stepped shape with a long external diameter at the disk mounting portion 202 side of rotor hub 20 and a short external diameter at the chassis 15 side. The chassis 15 side of stepped sleeve 80, namely the outer circumference of small-diameter part 801, is loosely fitted to inner circumference 171 of thrust adjusting plate 17, and additionally thrust adjusting plate 17 faces stepped surface 803 provided on sleeve 80 in the rotation axial direction across a predetermined distance. Inner circumference 171 of thrust adjusting plate 17 and stepped surface 803 prevent rotor hub 20 from being extracted axially.

Inner circumferential surface 804 of sleeve 80 has radial dynamic pressure bearing 22 formed between surface 804 and outer circumferential surface 209 of shaft 203. Outer circumferential surface 209 of shaft 203 has grooves with herring-bone pattern, composed of serially connected pairs of spiral grooves sloped symmetrically with respect to the rotational direction, as dynamic pressure generating grooves inducing a fluid dynamic pressure in the oil while rotor hub 20 is rotating, to form radial dynamic pressure bearing 22 between inner circumferential surface 804 and outer circumferential surface 209. At radial dynamic pressure bearing 22, a pumping force is increased owing to the herringbone grooves according to the rotation of rotor 13, thereby developing a fluid dynamic pressure to make sleeve 80 rotatably support shaft 203.

In the same way, the pump-in spiral grooves induce a radially inward pressure in the oil according to the rotation of rotor hub 20. The radially inward pressure promotes the oil flow to increase the inner pressure of the oil, and a fluid dynamic pressure acting in the reverse direction of the thrust force, namely the direction lifting rotor hub 20, is developed at thrust bearing 23. This action forms a thrust bearing by a dynamic pressure.

As shown in FIG. 6, employing rotating magnet 16 with its magnetization easy axis radially oriented and additionally with its outer circumferential surface polar-anisotropically oriented as a working face improves the operation efficiency of the spindle motor and faciliates slimming down of the spindle motor.

Rotating magnet 16 is oriented radially and additionally its outer circumferential surface is oriented polar-anisotropically as a working face, thereby dispensing with a back yoke made of magnetic material disposed at the inner circumference of rotating magnet 16. The reason is as follows. That is, using a regular magnet causes a magnetic force generated from the outer circumferential surface to be decreased due to such as deficient thickness of the back yoke disposed at the inner circumference of the rotating magnet. Meanwhile, such a problem does not arise with rotating magnet 16 employed in the first embodiment. Thus, the cross section of rotor hub 20 can be of a relatively simple shape and structure as shown in FIGS. 1 and 2. Consequently, shaft 203 can be processed simply, and the dimensional accuracy of the axiswise diameters can be ensured easily. That is to say, the amount of a gap between outer circumferential surface 209 of shaft 203 and inner circumferential surface 804 of sleeve 80 is managed easily, and thus the performance of radial dynamic pressure bearing 22 is managed easily and maintained stably as well.

The simple shape and structure of rotor hub 20 improve the processing accuracy when producing rotor hub 20 and suppresses the runout of disk mounting portion 202 and end surface 208, from shaft 203 to an extremely small extent. Consequently, the runout of disk plate 53 placed on disk mounting portion 202 in the direction of central axis A-A' of shaft 203 can be reduced, and the performance of thrust bearing 23 can be stabilized as well.

Further, in rotating magnet 16, arrangement is made so that a magnetic attractive force generated between the surface opposite to that fastened to rotor hub 20 and chassis 15 will generate a thrust force. Consequently, the amount of air gap between rotating magnet 16 and its opposite chassis 15 hardly fluctuates, thereby allowing the axiswise runout of disk mounting portion 202 and end surface 208 to be reduced as well.

A sintered magnet is generally produced in the following steps. First, a hollow cylinder-shaped mold with its axial and radial outer dimensions larger than those of the final shape is used to mold, and then sintering is carried out. After that, the outer circumference is processed into predetermined dimensions by grinding or cutting, and then sliced to a predetermined thickness to produce a desired shape. Generally, such manufacturing steps often do not include processing of the inner circumference of a magnet. When slicing a magnet into a desired shape, chipping often occurs at the circumferential edge of the magnet. In order to prevent rotor hub 20 from extracting in the axial direction, arrangement is made so that the inner circumferential radius of thrust adjusting plate 17 will be smaller than the internal diameter of rotating magnet 16 and smaller than the external diameter at the large-diameter side of sleeve 80, and thus thrust adjusting plate 17 can mask chipped parts of inner circumferential edge of rotating magnet 16, generated when producing rotating magnet 16. Such construction allows suppressing the fluctuation in magnetic attractive force between chassis 15 and rotating magnet 16, at chipped parts generated in the inner circumference of rotating magnet 16, namely the fluctuation in thrust force, thereby reducing axial runout. If there are seven chipped parts, for example, in the inner circumference of rotating magnet 16, runout is to occur axiswise seven times per rotation with a motor composed so as not to mask chipped parts in the inner circumference.

Here, experimental results for a case where a sintered magnet is used for rotating magnet 16 are described with reference to table 1 (shown below). In table 1, practical example 1 shows the case where thrust adjusting plate 17 is used with its external diameter substantially the same as that of rotating magnet 16, and its internal diameter larger than that of rotating magnet 16. In this case, chipped parts at the circumferential edge of rotating magnet 16 cannot be masked. Practical example 2 shows the case where thrust adjusting plate 17 is used with its external diameter smaller than that of rotating magnet 16, and its internal diameter smaller than that of rotating magnet 16. In this case, chipped parts at the circumferential edge of rotating magnet 16 can be masked. Under the circumstances, overall values are measured of axial runout of chassis 15 and rotating magnet 16 at the outer circumference of disk plate 53, in a frequency band corresponding to 12 times one rotation or higher, in a state where chassis 15 and rotating magnet 16 are formed so that a constant thrust force will be generated between them. Concretely, a frequency band of 720 Hz or higher is used for a spindle motor's rotation speed of 3,600 rpm. In the embodiment of the present invention, overall values of axiswise runout have been measured in a frequency band up to 800 Hz. The results are shown in table 1. Examination has been made under two conditions: practical examples 1 and 2 for samples 1 through 4.

TABLE 1

| Sample | Practical example 1 | Practical example 2 |
|---|---|---|
| 1 | 16.7 μmp-p | 11.0 μmp-p |
| 2 | 14.8 μmp-p | 12.3 μmp-p |
| 3 | 11.8 μmp-p | 10.1 μmp-p |
| 4 | 21.2 μmp-p | 10.3 μmp-p |

As evidenced by table 1, in both practical examples 1 and 2, the amount of axiswise runout at the outer circumference of disk plate 53 is in a range between 10.1 μmp-p and 21.2 μmp-p, proving extremely small. Particularly in example 2, where the inner circumference of rotating magnet 16 is covered, axiswise runout has been found to be further reduced.

Rotating magnet 16 is made of a magnet the material of which is produced by sintering, but a resin magnet may be used as well. Using a resin magnet as rotating magnet 16 prevents fracture and chipping from being generated in such as the circumferential edge of the magnet in a molding step for forming the magnet into a desired shape. Using such a resin-molded resin magnet as rotating magnet 16 and fastening thrust adjusting plate 17 with the above-described shape enable a thrust force between rotating magnet 16 and chassis 15 to have the same strength as that in sintered rotating magnet 16.

Meanwhile, the outer circumference of rotating magnet 16 where it is larger than the outer circumferential radius of thrust adjusting plate 17 is exposed from thrust adjusting plate 17. Accordingly, if outer circumferential runout of rotating magnet 16 occurs, a moment to incline the rotation axis occurs to generate axiswise runout at the outer circumference of a disk-shaped recording medium. For a magnet produced by sintering, however, the moment generated due to chipping at the inner circumference described above is larger than that due to outer circumferential runout of rotating magnet 16, and thus the moment to incline the rotation axis can be reduced by covering the inner circumference of the magnet as described above.

Meanwhile, if using a magnet produced with material free from fracture and chipping, such as a resin magnet, as rotating magnet 16, the following measures are desirably taken so that the outer circumference of rotating magnet 16 will not be exposed from thrust adjusting plate 17. That is, the outer circumferential radius of thrust adjusting plate 17 is made equal to or larger than that of rotating magnet 16, and the inner circumferential radius is larger than that of rotating magnet 16. Additionally, thrust adjusting plate 17 is formed so that a thrust force between rotating magnet 16 and chassis 15 will have the same strength as that in rotating magnet 16 made of the above-described sintered material.

With such measures taken, covering the outer circumference enables an attractive force to be generated in a smaller radial range, even with the same strength, thus allowing the moment to incline the rotation axis to be reduced.

Here, in the spindle motor according to the first embodiment, sleeve 80 may be fixed to chassis 15 through bearing retainer 31 as shown in FIG. 7. In this case, materials of sleeve 80, bearing retainer 31, and chassis 15 may be selected so that their linear expansion coefficients will be ascending in that order. Alternatively, the following selection can be made. That is, sleeve 80 and bearing retainer 31 are made of the same material, and the linear expansion coefficient of chassis 15 is lower than that of sleeve 80 and bearing retainer 31; the linear expansion coefficients are descending in the order of sleeve 80, bearing retainer 31, and chassis 15; or sleeve 80 and bearing retainer 31 are made of the same material, and the linear expansion coefficient of chassis 15 is higher that that of sleeve 80 and bearing retainer 31.

With such makeup, when bonding sleeve 80 to bearing retainer 31 and bonding bearing retainer 31 to chassis 15 when assembling a spindle motor, distortion of sleeve 80 occurring after hardening of the adhesive can be suppressed. Consequently, the bearing performance of radial dynamic pressure bearing 22 and thrust bearing 23 can be stabilized. In addition, the deterioration of the bonding strength between chassis 15 and bearing retainer 31 can be suppressed. Further, suppression can be made of the deterioration of the bonding strength due to the fluctuation in such as storage temperature and the change of the shape of the bearing material due to the fluctuation in working temperature.

The linear expansion coefficient of representative materials composing sleeve 80, bearing retainer 31, and chassis 15 is $20.9 \times 10^{-6}/°C$. for brass, $17.3 \times 10^{-6}/°C$. for austenitic ferrous material (referred to as "the austenitic" hereinafter), and $10.4 \times 10^{-6}/°C$. for martensitic ferrous material (referred to as "the martensitic" hereinafter).

Here, the change in the inner circumferential diameter of sleeve 80 has been obtained by structural analysis, when bonding each component of sleeve 80, bearing retainer 31, and chassis 15, with a thermosetting adhesive, while changing the combination of each material. The concrete size of sleeve 80 is 4.1 mm in outer circumferential diameter, 3 mm in inner circumferential diameter, and 1.1 mm in overall length. Meanwhile, radius difference RD, the difference between the radius of the top end of inner circumferential surface 804 of sleeve 80 and that of the bottom end, has been calculated, when bonding and hardening at 95° C. and then returning to room temperature (25° C.), with the bonding temperature being 95° C. The calculation results are shown in table 2. Here, radius difference RD shown in table 2 corresponds to the difference between the radius of the top end of radial dynamic pressure bearing 22 and that of the bottom end, where a positive value of radius difference RD indicates that the radius of the bottom end is larger.

TABLE 2

| | Sleeve 80 | Bearing retainer 31 | Chassis 15 | Radius difference RD (μm) |
|---|---|---|---|---|
| Composition 2-3 | Brass | Brass | Martensite | 0.2 |
| Composition 2-2 | Brass | Austenite | Martensite | 0.4 |
| Composition 2-1 | Brass | Martensite | Martensite | 1.0 |

As evidenced by table 2, radius difference RD has been found to change according to material of bearing retainer 31 if material of sleeve 80 is brass and that of chassis 15 is the martensitic.

In order to realize the performance as radial dynamic pressure bearing 22, a radial gap between outer circumferential surface 209 of shaft 203 and inner circumferential surface 804 of sleeve 80 is usually required to be set to 2 μm to 3 μm.

In table 2, composition 2-1 is composed of brass as the material of sleeve 80, and the martensitic as the material of chassis 15 and bearing retainer 31. In composition 2-1, a desired bearing rigidity is found unavailable if the design center value of a radial gap is 3 μm. That is, radius difference RD, the difference between the radius of the radial gap at the top end of radial dynamic pressure bearing 22 and that at the bottom end, is 1.0 μm, and thus the radial gap at the top end of radial dynamic pressure bearing 22 is 2.5 μm, and that at the bottom end is 3.5 μm, which means the gap deviates from the above-described allowable range of a gap.

In table 2, composition 2-2 shows the example where the linear expansion coefficient of the material of bearing retainer 31 is a center value, and linear expansion coefficients of the materials of sleeve 80, bearing retainer 31, and chassis 15 are different. If material of bearing retainer 31 is the austenitic; sleeve 80, brass; and chassis 15, the martensitic, radius difference RD, namely the difference between the radius of the radial gap at the top end of radial dynamic pressure bearing 22 and that at the bottom end, generated by hardening sleeve 80, bearing retainer 31, and chassis 15 with a thermosetting adhesive, is 0.4 μm, which is favorably less than half the case of composition 2-3.

In table 2, composition 2-3 shows the case where the linear expansion coefficients of the materials of bearing retainer 31 and sleeve 80 are the same or substantially the same, where the material of bearing retainer 31 is brass and that of sleeve 80 is brass as well, for example. With such a combination, radius difference RD, namely the difference between the radius of the radial gap at the top end of radial dynamic pressure bearing 22 and that at the bottom end, generated when hardening sleeve 80, bearing retainer 31, and chassis 15 with a thermosetting adhesive is half the case of composition 2-2, which is 0.2 µm.

Consequently, even for the composition where the linear expansion coefficient of the material of bearing retainer 31 is a center value; the materials of sleeve 80, bearing retainer 31, and chassis 15 have different linear expansion coefficients; sleeve 80 and bearing retainer 31 are bonded together; and bearing retainer 31 with sleeve 80 bonded thereto is bonded to chassis 15, the distortion of sleeve 80 generated when assembling a spindle motor, particularly a dynamic pressure bearing, can be suppressed, thereby stabilizing the bearing performance.

Also in the composition where the materials of sleeve 80 and bearing retainer 31 are the same, or the materials of sleeve 80 and bearing retainer 31 have substantially the same linear expansion coefficient; sleeve 80 and bearing retainer 31 are bonded together; and bearing retainer 31 with sleeve 80 bonded thereto is bonded to chassis 15, the distortion of sleeve 80 generated when assembling a spindle motor, particularly a dynamic pressure bearing, can be suppressed, thereby stabilizing the bearing performance. Further, a great bonding strength is obtained between chassis 15 and bearing retainer 31.

Moreover, the bonding strength is unlikely to decrease with the fluctuation in storage temperature or temperature rise during operation. Hereinafter, a description is made for a decrease in the bonding strength. If the linear expansion coefficients of the materials are substantially the same, the materials expand and contract at substantially the same rate, and thus the bonding surfaces hardly move. A significant difference in linear expansion coefficient causes positions of bonding surfaces to change. This causes fatigue destruction in the bonding surfaces with repeated changes in storage temperature and operating temperature, resulting in a decrease in the bonding strength. Therefore, using materials with their linear expansion coefficients substantially the same is unlikely to decrease the bonding strength, as well as to suppress the change in the shape of radial dynamic pressure bearing 22.

Further, the results obtained by structural analysis under the same conditions as in table 2 described above are shown in table 3 for the composition where the material of chassis 15 is aluminum, and the material of sleeve 80 is the martensitic or ferrite, where the linear expansion coefficient of aluminum is 20.3×10−6/° C.

TABLE 3

|  | Sleeve 80 | Bearing retainer 31 | Chassis 15 | Radius difference RD (µm) |
|---|---|---|---|---|
| Composition 3-1 | Martensite | Brass | Aluminum | −1.1 |
| Composition 3-2 | Martensite | Austenite | Aluminum | −0.4 |
| Composition 3-3 | Martensite | Martensite | Aluminum | −0.2 |

In table 3, composition 3-1 shows the case where the material of sleeve 80 is the martensitic; chassis 15, aluminum; and bearing retainer 31, brass. If the design center value of a radial gap between outer circumferential surface 209 of shaft 203 and inner circumferential surface 804 of sleeve 80 is set to 3 µm, the dynamic pressure at the top of radial dynamic pressure bearing 22 falls below the design value, and thus a desired bearing rigidity becomes unavailable. The reason is described hereinafter. That is, radius difference RD, namely the difference between the radius of the radial gap at the top end of radial dynamic pressure bearing 22 and that at the bottom end, is −1.1 µm, thus the radial gap at the top end of radial dynamic pressure bearing 22 is 3.55 µm, and that at the bottom end is 2.45 µm. Consequently, the gap at the top of radial dynamic pressure bearing 22 deviates from the allowable range, resulting in the dynamic pressure being lower than the design value.

In table 3, composition 3-2 shows the case where the linear expansion coefficient of the material of bearing retainer 31 is a center value, and the linear expansion coefficients of the materials of sleeve 80, bearing retainer 31, and chassis 15 are different. For example, the material of bearing retainer 31 is the austenitic; sleeve 80, the martensitic or ferritic ferrous material; and chassis 15, aluminum. In such a case, radius difference RD, namely the difference between the radius of the radial gap at the top end of radial dynamic pressure bearing 22 and that at the bottom end, generated by hardening sleeve 80, bearing retainer 31, and chassis 15 with a thermosetting adhesive, is −0.4 µm, which is extremely small.

In table 3, composition 3-3 shows the case where the materials of bearing retainer 31 and sleeve 80 have the same or substantially the same linear expansion coefficient. For example, the material of bearing retainer 31 is the martensitic; sleeve 80, the martensitic; and chassis 15, aluminum. In this case, radius difference RD, namely the difference between the radius of the radial gap at the top end of radial dynamic pressure bearing 22 and that at the bottom end, generated when hardening sleeve 80, bearing retainer 31, and chassis 15 with a thermosetting adhesive is −0.2 µm, which is even smaller.

As evidenced by table 3, the composition may be employed where the materials of sleeve 80, bearing retainer 31, and chassis 15 have different linear expansion coefficients; sleeve 80 and bearing retainer 31 are bonded together; and bearing retainer 31 with sleeve 80 bonded thereto is bonded to chassis 15. With such a composition, the distortion of sleeve 80 is suppressed, thereby stabilizing the bearing performance, as well as providing a great bonding strength between chassis 15 and bearing retainer 31.

Alternatively, the composition may be employed where the materials of sleeve 80 and bearing retainer 31 are the same, or the materials of sleeve 80 and bearing retainer 31 have substantially the same linear expansion coefficient; sleeve 80 and bearing retainer 31 are bonded together; and bearing retainer 31 with sleeve 80 bonded thereto is bonded to chassis 15. With such a composition, the distortion of sleeve 80 is suppressed, thereby stabilizing the bearing performance, as well as providing a great bonding strength between chassis 15 and bearing retainer 31. Moreover, the bonding strength is unlikely to decrease with the fluctuation in storage temperature or temperature rise during operation, while suppressing the change of the shape of radial dynamic pressure bearing 22.

Next, another example of a spindle motor according to the first embodiment, will be described with reference to FIGS. 8 and 9.

This spindle motor is different from that previously described according to the first embodiment in that back yoke 25, which is ring-shaped, is made of material different from that of rotor hub 20, and is attached at inner circumferential surface 804 of rotating magnet 16. Attaching back yoke 25 allows rotating magnet 16 to be made of a magnet regularly magnetic-field oriented instead of a polar-anisotropic magnet. Further, flange 201 of rotor hub 20, particularly disk mounting portion 202, mounting surface 204, counter-face surface 205, and shaft 203 can be processed integrally and highly accurately, thereby implementing a spindle motor with high axial runout accuracy and a small amount of oil leakage.

As described above, in a spindle motor of the first embodiment according to another example, rotating magnet 16 can be made of a magnet regularly magnetic-field oriented, as well as a magnet with its magnetization easy axis radially oriented and additionally with its outer circumferential surface polar-anisotropically oriented as a working face.

Next, a disk drive device 50 with a spindle motor of the first embodiment mounted thereon, is described with reference to FIG. 10. The inside of housing 51 forms a clean space with an extremely small amount of dust and the like, where spindle motor 52 with disk-shaped disk plate 53 for storing information is attached thereto. The housing 51 further has head moving mechanism 57 arranged therein, which is an information access means that reads and writes information from and to disk plate 53. Head moving mechanism 57 is composed of head 56 that reads and writes information on disk plate 53; arm 55 that supports head 56; and actuator 54 that moves head 56 and arm 55 to a predetermined position on disk plate 53.

Using a spindle motor of the first embodiment as spindle motor 52 of such disk drive device 50 provides desired rotation accuracy, while allowing for slimming down and cost reduction of disk drive device 50.

As described above, the first embodiment dispenses with disposing a back yoke made of magnetic material, at the inner circumference of the rotating magnet, thereby making the shape of the cross section of the rotor hub relatively simple. Thus, the shaft can be processed easily and the rotor hub can be produced inexpensively. Additionally, the amount of gap between the outer circumferential surface of the shaft and the inner circumferential surface of the sleeve is managed easily, and thus the performance of the radial dynamic pressure bearing is managed easily and maintained stably as well.

The simplified shape and structure of the rotor hub enables processing with a high degree of accuracy a rotor hub for suppressing runout of the end surfaces of the disk mounting portion and the shaft of the rotor hub, from the shaft. Further, fluctuation in the amount of an air gap between the rotating magnet and its opposite chassis is unlikely to occur, thus stabilizing a thrust force generated between the rotating magnet and the chassis.

Chipped parts at the inner circumference of a rotating magnet, which are likely to occur when producing the rotating magnet, can be masked by the thrust adjusting plate to suppress the fluctuation in a thrust force between the chassis and the rotating magnet at the chipped parts of the rotating magnet, thus reducing the axial runout at the end surfaces of the disk mounting portion and the shaft of the rotor hub. This reduces runout in the direction of the rotation axis of a disk plate placed on the disk mounting portion and stabilizes the performance of the thrust bearing.

In addition, the rotating magnet is made of a magnet with its magnetization easy axis radially oriented and additionally with its outer circumferential surface polar-anisotropically oriented as a working face, thereby improving the motor efficiency and allowing for slimming down.

Thus, a spindle motor is provided that includes a stable dynamic pressure bearing and a disk mounting portion having high rotation accuracy.

Mounting such a spindle motor suppresses runout of a disk plate to an extremely small extent, thus allowing stable reading and reproducing of information, to provide a slim, highly stable, reliable disk drive device.

Here, the makeup of a spindle motor according to the first embodiment is described in order as follows.

That is, a spindle motor of the present invention includes (a) rotor hub 20 composed of disk-shaped flange 201 having disk mounting portion 202 for placing a disk thereon, on one main surface of hub 20; and cylinder-shaped shaft 203 formed on one main surface of flange 201, opposite to disk mounting portion 202; (b) ring-shaped rotating magnet 16 fastened concentrically with shaft 203, on one main surface of flange 201, opposite to disk mounting portion 202; (c) armature 14 facing rotating magnet 16, and generating a rotating force with central axis A-A' of shaft 203 as the center, for rotating magnet 16; (d) sleeve 80 facing one main surface of flange 201, opposite to disk mounting portion 202, and rotatably supporting shaft 203; and (e) chassis 15 fixing armature 14 and sleeve 80.

In addition, (f) flange 201 and shaft 201 of rotor hub 20 are integrally formed with magnetic material; (g) a protrusion is not provided between the mounting surface 204 for mounting rotating magnet 16 thereon and counter-face surface 205 facing the end surface of sleeve 80, on one main surface of flange 201, opposite to disk mounting portion 202; (h) and additionally mounting surface 204 and counter-face surface 205 are on a level plane orthogonal to the direction of central axis A-A' of shaft 203, or mounting surface 204 is recessed stepwise from counter-face surface 205 toward disk mounting portion 202.

Second Exemplary Embodiment

Figure 11:
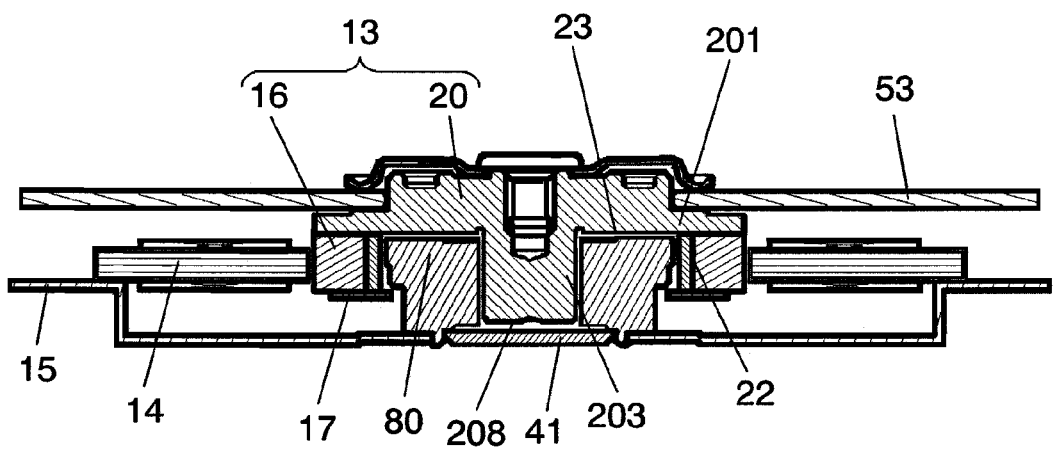
FIG. 11 is a sectional view illustrating the makeup of a spindle motor according to the second exemplary embodiment of the present invention.
Figure 12:
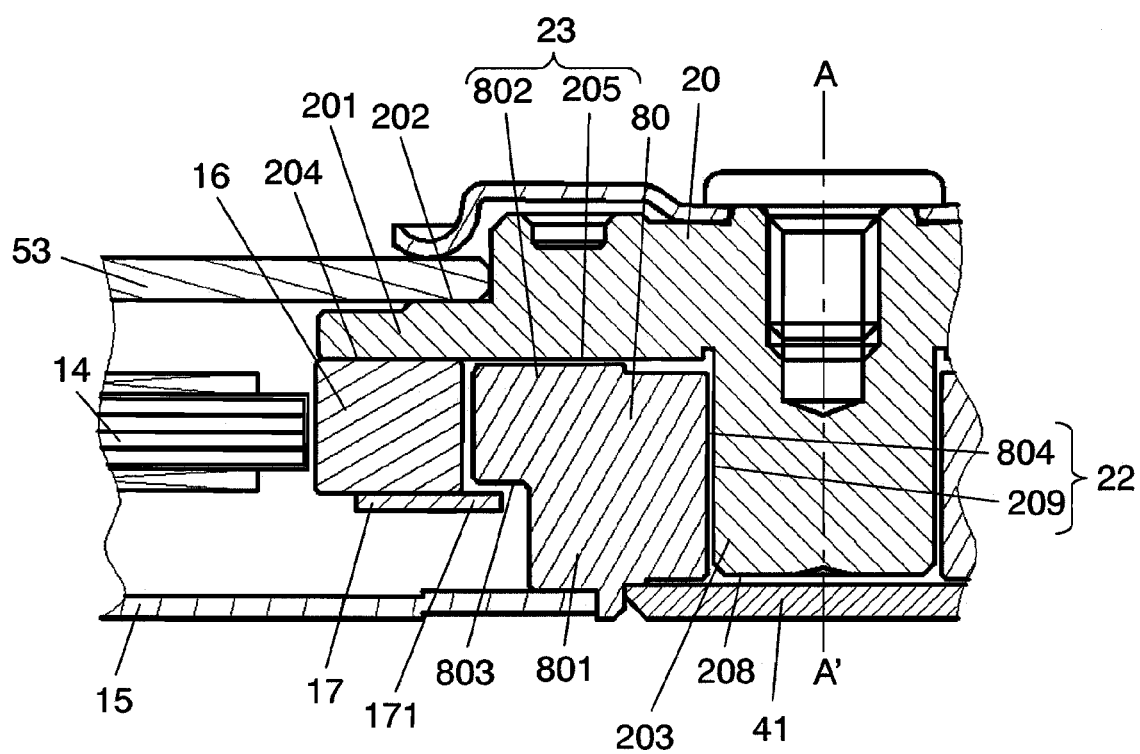
FIG. 12 is an enlarged sectional view illustrating the proximity of the dynamic pressure bearing of the spindle motor in the spindle motor according to the second embodiment of the present invention.
Figure 13:
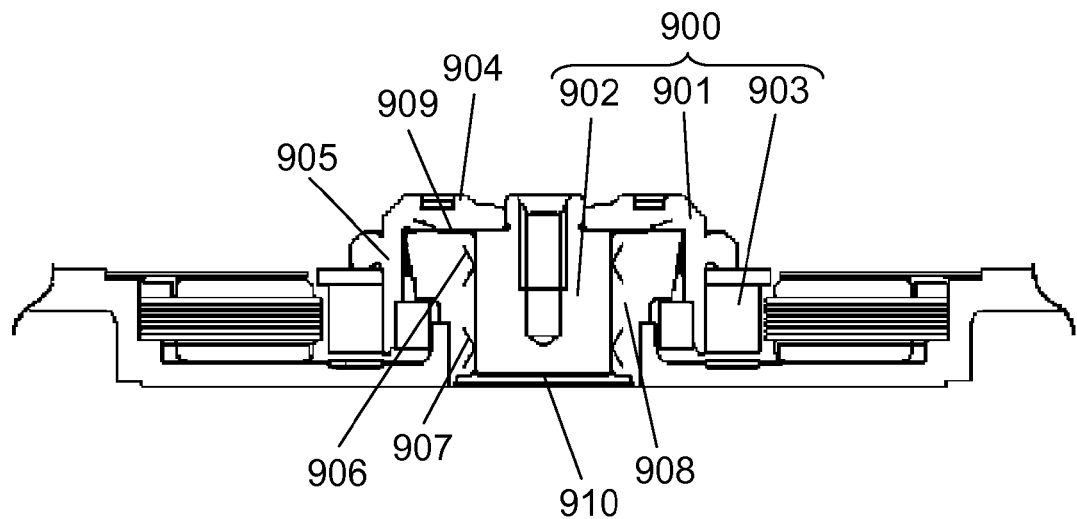
FIG. 13 is a sectional view illustrating an example of a conventional spindle motor.
Figure 14:
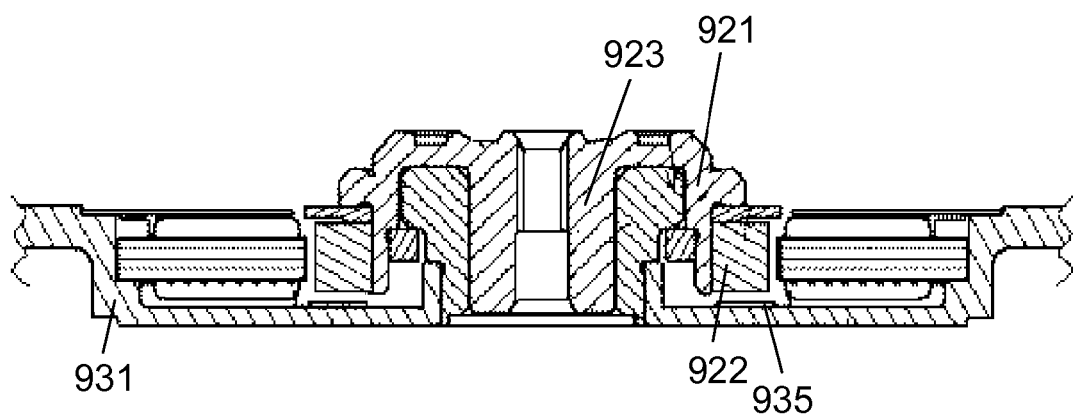
FIG. 14 is a sectional view illustrating another example of a conventional spindle motor.

FIGS. 11 and 12 illustrate a spindle motor according to the second embodiment. FIG. 11 is a sectional view illustrating the makeup of the spindle motor. FIG. 12 is an enlarged sectional view of the proximity of the dynamic pressure bearing of the spindle motor shown in FIG. 11.

The main difference between the makeup of the spindle motor of the second embodiment and that of the first embodiment is as follows. That is, in the first embodiment, thrust bearing 23 is composed of end surface 208 of shaft 203 of rotor hub 20 and its opposite thrust plate 40. In the second embodiment, meanwhile, thrust bearing 23 is composed of counter-face surface 205 of flange 201 of rotor hub 20 and end surface 802 of sleeve 80.

The spindle motor according to the second embodiment is provided with hollow cylinder-shaped sleeve 80 rotatably supporting shaft 203 of rotor hub 20. Further, seal cap 41 is fastened to the bottom of sleeve 80 by bonding or the like on the surface blocking the bottom of sleeve 80 and additionally facing end surface 208 of shaft 203. In rotor hub 20, rotating magnet 16 is fastened to mounting surface 204 provided on the same plane as counter-face surface 205 orthogonal to central axis A-A' of shaft 203 and additionally facing end surface 802 of sleeve 80. Rotating magnet 16 is a magnet with its magnetization easy axis radially oriented and additionally with its outer circumferential surface polar-anisotropically oriented as a working face, as shown in FIG. 6, and is fastened by such as bonding.

End surface 802 of sleeve 80 has pump-in spiral grooves (not shown) formed thereon that induces a radially inward pressure (toward central axis A-A' of shaft 203) in the oil, during the rotation of rotor hub 20.

A magnetic attractive force generated between rotating magnet 16 and chassis 15 made of magnetic material biases rotor hub 20 toward chassis 15, where counter-face surface 205 of rotor hub 20 and the spiral grooves provided on end surface 802 of sleeve 80 compose thrust bearing 23.

Arrangement is made so that the distance of a gap between end surface 208 of shaft 203 and seal cap 41 will be longer than that between counter-face surface 205 of rotor hub 2 and the surface of end surface 802 of sleeve 80, in which spiral grooves are formed, both forming thrust bearing 23.

Armature 14 is provided that faces rotating magnet 16 from radially outward through a predetermined air gap and generates a rotating force with central axis A-A' of shaft 203 as the center, between armature 14 and rotating magnet 16. Armature 14 and sleeve 80 are fixed to chassis 15 made of magnetic material.

Then, a series of minute gaps is formed between end surface 802 of sleeve 80 and counter-face surface 205 of rotor hub 20; between outer circumferential surface 209 of shaft 203 and inner circumferential surface 804 of sleeve 80; and subsequently between end surface 208 of shaft 203 and seal cap 41. The minute gaps retain oil therein continuously, forming a dynamic pressure bearing with what is called fulfilling structure.

At radial dynamic pressure bearing 22 with the same makeup as the first embodiment, a pumping force is increased owing to the herringbone grooves according to the rotation of rotor 13, thereby developing a fluid dynamic pressure to make sleeve 80 rotatably support shaft 203.

The pump-in spiral grooves induce a pressure in the oil radially inward according to the rotation of rotor hub 20 composing rotor 13. The radially inward pressure promotes the oil flow to increase the inner pressure of the oil, and a fluid dynamic pressure acting in the direction lifting rotor hub 20 is developed at thrust bearing 23.

In this way, the spindle motor according to the second embodiment forms thrust bearing 23 with end surface 802 of sleeve 80 with spiral grooves formed thereon and its opposite counter-face surface 205. This makeup allows the area forming thrust bearing 23 to be expanded radially, thereby further increasing the bearing rigidity as a thrust bearing.

Because end surface 208 of shaft 203 does not especially need to be finished to a smooth surface, rotor hub 20 can be processed more easily and thus inexpensively.

The makeup of the retainer for preventing rotor hub 20 from extracting axiswise (coming out axially) by means of thrust adjusting plate 17, and the effects of suppressing axial runout of disk mounting portion 202 are the same as the first embodiment.

As described above, the second embodiment, in addition to providing the same effects as the first embodiment, enables a rotor hub to be processed even more easily and to be produced less expensively, as well as increasing the bearing rigidity of the thrust bearing. Thus, a highly reliable spindle motor can be provided that is equipped with an inexpensive, slim, stably operating dynamic pressure bearing.

Mounting such a spindle motor suppresses runout of disk plate 53 to an extremely small extent, thus allowing stable writing and reproducing of information, to provide a highly stable, reliable disk drive device.

In the second embodiment as well, the makeup of one main surface provided with mounting surface 204 and counter-face surface 205 in the same way as in the first embodiment may be that shown in FIGS. 3 and 4 instead of that in FIG. 12, providing the same effects.

Further, in the second embodiment, sleeve 80 may be fixed to chassis 15 through bearing retainer 31 shown in FIG. 7 in the same way as in the first embodiment. In this case, sleeve 80, bearing retainer 31, and chassis 15 may be of any materials as long as their linear expansion coefficients are ascending or descending in that order. With such a composition, when bonding sleeve 80 to bearing retainer 31 and bonding bearing retainer 31 to chassis 15 when assembling a spindle motor, the distortion of sleeve 80 occurring after hardening of the adhesive can be suppressed in the same way as in the first embodiment. Consequently, the bearing performance of radial dynamic pressure bearing 22 and thrust bearing 23 can be stabilized, and the deterioration of the bonding strength between chassis 15 and bearing retainer 31 can be suppressed as well.

Further, in the second embodiment, back yoke 25 made of material different from that of rotor hub 20 shown in FIGS. 8 and 9 may be attached on one main surface of flange 201 of rotor hub 20, opposite to disk mounting portion 202, in the same way as the first embodiment.

In the first and the second embodiments, the description is made for a practical example of a spindle motor and a disk drive device according to the present invention. However, the present invention is not limited to the example, but various kinds of deformation and correction are possible in a range of design factors without deviating from the scope of the present invention.

For example, a means provided at thrust bearing 23 to generate a radially inward pressure in the oil may be herringbone grooves radially asymmetrical, instead of pump-in spiral grooves. In this case, setting is made so that a pumping force due to spiral grooves positioned radially outward will be stronger than that inward. With this setting, the balance of pumping forces between these spiral grooves results in a radially inward pressure being exerted on the oil.

In radial dynamic pressure bearing 22 and thrust bearing 23 of the first and second embodiments, grooves may be formed in at least one of the surfaces facing each other, for forming grooves of each bearing thereon. In other words, for radial dynamic pressure bearing 22, grooves need to be formed in at least one of outer circumferential surface 209 of shaft 203 and inner circumferential surface 804 of sleeve 80, of rotor hub 20, as the minimum requirement. For thrust bearing 23, respective grooves need to be formed in at least one of end surface 208 of shaft 203 and thrust plate 40 (first embodiment), or counter-face surface 205 of rotor hub 20 and end surface 802 of sleeve 80 (second embodiment), as the minimum requirement.

Further, in the first and second embodiments, arrangement is made so that the outer circumferential radius of thrust adjusting plate 17 will be smaller than that of rotating magnet 16, and the inner circumferential radius of thrust adjusting plate 17 will be smaller than that of rotating magnet 16 to obtain a predetermined thrust force. However, arrangement may be made so that the outer circumferential radius of thrust adjusting plate 17 will be substantially the same as that of rotating magnet 16, and the inner circumferential radius of thrust adjusting plate 17 will be smaller that that of rotating magnet 16 to obtain a predetermined thrust force.

Particularly, if rotating magnet 16 is made of resin as its base material, chipping is unlikely to occur at the inner circumference, thus enabling the position on which a thrust force is exerted to be moved to further inwardly. This situation limits the influence of the change of an air gap between rotating magnet 16 and chassis 15, particularly the condition of the surface of chassis 15, facing rotating magnet 16, which is effective in suppressing axial runout. Therefore, the size of thrust adjusting plate 17 needs to be determined by the base material of rotating magnet 16 used for the spindle motor or the machining state of the inner circumference, as the minimum requirement.

As described above, a spindle motor according to the present invention allows the rotor hub to be produced inexpensively and facilitates managing the amount of gap between the outer circumferential surface of the shaft and the inner circumferential surface of the sleeve, thereby stabilizing the bearing performance as a radial dynamic pressure bearing. Further, the rotating magnet is made of a magnet with its magnetization easy axis radially oriented and additionally with its outer circumferential surface polar-anisotropically oriented as a working face, thus improving the operation efficiency of the motor, as well as slimming down the motor. For example, the motor can be easily applied even to a miniature disk drive device for driving a one-inch-diameter hard disk. As described above, a spindle motor of the present invention is useful in device such as hard disk drive devices, magneto-optical disk drive devices, and optical disc drive devices, thus having wide industrial applicability.

The invention claimed is:

1. A spindle motor comprising:
    a rotor hub including a disk-like flange having a disk mounting portion for placing a disk thereon, on one main surface of the rotor hub; and a shaft with a cylinder-shaped outer circumference, formed at a central part of one main surface of the flange, opposite to the disk mounting portion;
    a ring-shaped rotating magnet fastened on one main surface of the flange, opposite to the disk mounting portion, concentrically with a central axis of the shaft;
    an armature facing the rotating magnet and generating a rotating force with a central axis of the shaft as a center, for the rotating magnet;
    a sleeve facing one main surface of the flange, opposite to the disk mounting portion, and rotatably supporting the shaft; and
    a chassis fixing the armature and the sleeve, wherein the flange and the shaft of the rotor hub are integrally formed with magnetic material; and wherein
    a protrusion is not provided between a mounting surface for mounting the rotating magnet thereon and a counter-face surface facing an end surface of the sleeve, on one main surface of the flange, opposite to the disk mounting portion, and additionally the mounting surface and the counter-face surface are orthogonal to a direction of a central axis of the shaft, and are in a level plane; or the mounting surface is recessed stepwise from the counter-face surface toward the disk mounting portion.

2. The spindle motor of claim 1, wherein a cylinder-shaped back yoke made of magnetic material is attached at an inner circumference of the ring-shaped rotating magnet.

3. The spindle motor of claim 1, wherein the rotating magnet has a magnetization easy axis radially oriented and additionally has an outer circumferential surface polar-anisotropically oriented as a working face.

4. The spindle motor of claim 1, wherein the chassis is made of magnetic material, and a thrust adjusting plate made of magnetic material, for adjusting a thrust force generated between the rotating magnet and the chassis is disposed on a surface facing the chassis of the rotating magnet.

5. The spindle motor of claim 4, wherein the thrust adjusting plate is ring-shaped with an outer circumferential radius equal to or larger than that of the rotating magnet, and additionally with an inner circumferential radius larger than that of the rotating magnet.

6. The spindle motor of claim 4, wherein the thrust adjusting plate is ring-shaped with an inner circumferential radius equal to or smaller than that of the rotating magnet, and additionally with an outer circumferential radius smaller than that of the rotating magnet.

7. The spindle motor of claim 6, wherein an inner circumference of the thrust adjusting plate faces in a direction of a central axis of the shaft with a predetermined distance from a stepped surface provided orthogonally to a central axis of the shaft, at an outer circumference of the sleeve.

8. The spindle motor of claim 1, wherein the sleeve is fixed to the chassis by a bearing retainer; and wherein
    the sleeve, the bearing retainer, and the chassis are made of materials with their linear expansion coefficients ascending in order of the sleeve, the bearing retainer, and the chassis;
    the sleeve and the bearing retainer are made of same material and a linear expansion coefficient of the chassis is higher than that of the material of the sleeve and the bearing retainer;
    the sleeve, the bearing retainer, and the chassis are made of materials with their linear expansion coefficients descending in order of the sleeve, the bearing retainer, and the chassis; or
    the sleeve and the bearing retainer are made of same material and a linear expansion coefficient of the chassis is lower than that of the material of the sleeve and the bearing retainer.

9. The spindle motor of claim 1, wherein a dynamic pressure generating groove is formed in at least either one of an end surface of the shaft of the rotor hub and a thrust plate fastened to the sleeve so as to face the end surface, both blocking a bottom of the sleeve; and a thrust bearing is formed with the end surface of the shaft of the rotor hub and the thrust plate.

10. The spindle motor of claim 1, wherein a dynamic pressure generating groove is formed in at least one of a top end surface of the sleeve and one main surface opposite to the disk mounting portion of the flange facing the top end surface, and a thrust bearing is formed with the top end surface of the sleeve and the one main surface opposite to the disk mounting portion of the flange facing the top end surface.

11. A disk drive device on which a disk-shaped recording medium for recording information is attached, comprising:
    a housing;
    a spindle motor, according to claim 1, that is fixed to an inside of the housing and rotates the disk-shaped recording medium; and
    an information access means for writing and reading information to and from a predetermined position of the disk-shaped recording medium.

* * * * *